US008874753B2

(12) United States Patent
Ben-Ezra et al.

(10) Patent No.: US 8,874,753 B2
(45) Date of Patent: Oct. 28, 2014

(54) OPTIMIZED COOPERATION BETWEEN RESOURCE LIST SERVERS AND PRESENCE SERVERS

(75) Inventors: Asaf Ben-Ezra, Acco (IL); Yulia Kantarovich, Rehovot (IL); Uri Segev, Or-Yehuda (IL); Ofira Tal-Aviv, Moshav Bitzaron (IL); Asaf Zinger, Givat Shmuel (IL)

(73) Assignee: International Business Machines Corporation, Armonk, NY (US)

( * ) Notice: Subject to any disclaimer, the term of this patent is extended or adjusted under 35 U.S.C. 154(b) by 3 days.

(21) Appl. No.: 13/613,740

(22) Filed: Sep. 13, 2012

(65) Prior Publication Data

US 2013/0007213 A1 Jan. 3, 2013

Related U.S. Application Data

(63) Continuation of application No. 12/633,690, filed on Dec. 8, 2009, now Pat. No. 8,332,516.

(51) Int. Cl.
*G06F 15/173* (2006.01)
*H04L 12/58* (2006.01)

(52) U.S. Cl.
CPC .......... *H04L 12/5815* (2013.01); *H04L 51/043* (2013.01)
USPC ............................ 709/226; 709/229; 370/352

(58) Field of Classification Search
CPC ................................................. H04L 29/08684
USPC .................................. 709/226, 229; 370/352
See application file for complete search history.

(56) References Cited

U.S. PATENT DOCUMENTS

| 7,979,567 | B2 * | 7/2011 | Schneider et al. ............ 709/229 |
| 8,005,073 | B2 | 8/2011 | Kiss et al. |
| 2007/0016673 | A1 | 1/2007 | Shinohara et al. |
| 2007/0016674 | A1 | 1/2007 | Shinohara et al. |

(Continued)

FOREIGN PATENT DOCUMENTS

| EP | 2012462 A1 * | 1/2009 |
| WO | 2008004962 A1 | 1/2008 |

OTHER PUBLICATIONS

IBM WebSphere Presence Server, The Presence Server Entry Point, 2009 URL:http://publib.boulder.ibm.com/infocenter/wtelecom/v7r0m0/index.jsp?topic=/com.ibm.presence.intro.doc/entrypoint_c.html, 4 pages.

(Continued)

*Primary Examiner* — Glenford Madamba
(74) *Attorney, Agent, or Firm* — Prentiss Johnson; Edell, Shapiro & Finnan, LLC

(57) ABSTRACT

A method, system and computer program product for optimized cooperation between resource list servers and presence servers. The method including receiving a subscription request from a watcher, where the subscription request identifies a resource list and is a request to receive presence information regarding each of a plurality of presentities listed on the resource list, and generating a subscription request to a presence server for presence information regarding any presentity listed on the resource list only if no other currently-active subscription request is known by the resource list server to exist for presence information regarding the presentity.

27 Claims, 6 Drawing Sheets

(56) References Cited

U.S. PATENT DOCUMENTS

| | | | |
|---|---|---|---|
| 2007/0033278 A1 | 2/2007 | Kelley et al. | |
| 2008/0008185 A1* | 1/2008 | Lindgren et al. | 370/393 |
| 2008/0043723 A1 | 2/2008 | Lindgren et al. | |
| 2008/0183866 A1 | 7/2008 | Maeda et al. | |
| 2009/0083419 A1 | 3/2009 | He et al. | |
| 2010/0262697 A1* | 10/2010 | Lindgren et al. | 709/227 |
| 2011/0138054 A1 | 6/2011 | Ben-Ezra et al. | |

OTHER PUBLICATIONS

My Media "Presence Server", 2009 URL:http://www.semantic-iptv.de/index.php?id=presence, 2 pages.

V.K. Singh et al. "SIMPLE Presence Traffic Optimization and Server Scalability", 1967, IETF '67 http://www.ietf.org/proceedings/06nov/slides/simple-2/simple-2.ppt#1, 26 pages.

A. Houri et al., "Scaling Optimizations for Presence in SIP/SIMPLE", 2007 http://toolsietrorg.html/draft-houri-simple-interdomain-scaling-optimizations-00 (section 2.1.3) pp. 1-20.

\* cited by examiner

OPTIMIZED COOPERATION BETWEEN RESOURCE LIST SERVERS AND PRESENCE SERVERS

CROSS-REFERENCE TO RELATED APPLICATIONS

This application is a continuation of U.S. patent application Ser. No. 12/633,690, entitled "Optimized Cooperation Between Resource List Servers and Presence Servers" and filed Dec. 8, 2009, the disclosure of which is incorporated herein by reference in its entirety.

FIELD OF THE INVENTION

The present invention relates to computer networks in general, and more particularly to providing information to networked entities regarding the status of other networked entities.

BACKGROUND OF THE INVENTION

The Session Initiation Protocol (SIP) is a protocol for creating, modifying, and terminating computer network-based communication sessions, such as for an Internet-based telephone call between two or more participants. Since its introduction numerous enhancements to SIP have been proposed, including the SIP Instant Messaging and Presence Leveraging Extensions (SIMPLE) framework in which one or more network entities, such as computer users, create subscriptions on a server, known as a "presence" server, to receive presence information regarding another network entity, referred to as a "presentity." When a change in the presentity's presence information is detected, such as when the presentity "publishes" such a change to the presence server, SIP is used to send a notification to the subscribers regarding the change.

Further enhancements to SIP, such as those described in RFCs 3857 and 3858 of the Internet Engineering Task Force, provide a mechanism for subscribing to information regarding subscribers to a presentity's presence information. In this context, subscribers to a presentity's presence information are referred to as "watchers," the information regarding these subscribers is referred to as "watcher information," and the subscriber to watcher information is referred to as a "watcher information subscriber." Both presence information and watcher information are preferably maintained in the Extensible Markup Language (XML). The watcher information subscriber may use this information, for example, to detect unauthorized subscriptions for the presentity's presence information.

Other enhancements to SIP, such as those described in RFCs 3265 and 4662, provide a mechanism for enabling a watcher to subscribe to receive presence information for a group of presentities, whereby the watcher sends a single subscription request to a resource list server with respect to a resource list that includes multiple presentities. Then, for each presentity listed in the resource list, the resource list server sends a separate subscription request on behalf of the watcher to a presence server that will provide presence information for that presentity. For each watcher subscription that is made to the same resource list, the resource list server generates separate presence server subscriptions for each presentity on the list. Similarly, for watcher subscriptions to different resource lists that include the same presentity, the resource list server generates multiple presence server subscriptions for the same presentity. The management of each subscription necessarily requires computer processing, storage, and networking resources.

In the prior art a system is provided for maintaining presence information of public group members, which includes a presence server and a group list management server, and further includes a presence group server connected to the presence server and the group list management server and adapted to obtain information of the public group members from the group list management server according to a received subscription request for the presence information of the public group members, subscribe for the presence information of the public group members from the presence server, and save the presence information of the public group members. A presence group server and a method for maintaining presence information of public group members are also provided. In this system, unfortunately, multiple requests for the presence information of the public group members result in multiple subscriptions being created for each member of the group.

The prior art also describes using routing to distribute SIP requests among clusters, where a number of different presence server clusters are deployed, each cluster handling incoming SIP requests for a particular subset of users. In this scenario a separate resource list server component is deployed to handle all subscriptions on presence lists. Unfortunately, here too are multiple subscriptions generated for multiple requests for presence information regarding the same presentity.

The prior art also describes various embodiments for providing a list-based subscription service, where one group of embodiments involves receiving a subscription to a list to which multiple list members are associated and then providing a notification when an aggregated state of the list satisfies a condition. The aggregated state of the list is based on at least a portion of the state information that pertains to each of the list members. Another group of embodiments involves sending a subscription to a list to which multiple list members are associated and then receiving a notification when an aggregated state of the list satisfies a condition. Unfortunately, as before, multiple subscriptions are generated for multiple requests for presence information regarding the same presentity.

In another prior art system, a presence server sets a group identifier as an identifier which is used to collectively look up a group of multiple pieces of presence information provided by presence information providers who have agreed to a use policy, aggregates and stores the presence information under the group identifier, and delivers the presence information requested to the group identifier. Each presentity provides the presence server with its presence information targeted to the group identifier. Each watcher requests the group identifier for the presence information provided by the presentities, and receives the presence information delivered from the presence server. However, multiple requests for presence information by group identifier still results in multiple subscriptions being created per presentity.

A prior art method for reducing memory usage for communications between servers in a communication network utilizing SIP does so by controlling establishment of SIP-Tunnels. A single SIP-Tunnel for a certain event package is utilized for multiple subscriptions between one instance of a requesting server such as a resource list server, and one instance of an application server such as a presence server. The SIP-Tunnel is then utilized to send all SIP NOTIFY messages between these two entities to reduce memory usage at both ends by removing the overhead created by SIP. However, this method is silent with regard to reducing or eliminating multiple subscriptions created per presentity as is described hereinbelow.

In another prior art system a presence server acts as a special SIP application server to manage service- and user-related presence information, and employs a resource list server to allow single presence subscriptions on a group of entities that results in an aggregated notification with the requested data. Unfortunately, here too are multiple subscriptions generated for multiple requests for presence information regarding the same presentity.

Prior art mechanisms that do describe reducing the number of subscriptions between a resource list server and a presence server do not describe how to handle subscriptions for watcher information.

Systems, methods, and/or computer program products for reducing the number of presence server subscriptions generated by a resource list server for watcher subscriptions to resource lists, as well as handle subscriptions for watcher information, would therefore be advantageous.

SUMMARY OF THE INVENTION

In one aspect of the invention a method is provided for optimized cooperation between resource list servers and presence servers, the method including receiving a subscription request from a watcher, where the subscription request identifies a resource list and is a request to receive presence information regarding each of a plurality of presentities listed on the resource list, and generating a subscription request to a presence server for presence information regarding any presentity listed on the resource list only if no other currently-active subscription request is known by the resource list server to exist for presence information regarding the presentity. In other aspects of the invention the method may be implemented in computer hardware as a system and/or in computer software in a computer program product including a computer readable medium and computer program instructions stored on the computer readable medium, operative to cause the computer to perform the functions and operations associated with the above-disclosed method.

BRIEF DESCRIPTION OF THE DRAWINGS

The invention will be understood and appreciated more fully from the following detailed description taken in conjunction with the appended drawings in which.

DETAILED DESCRIPTION OF THE INVENTION

Figure 1:
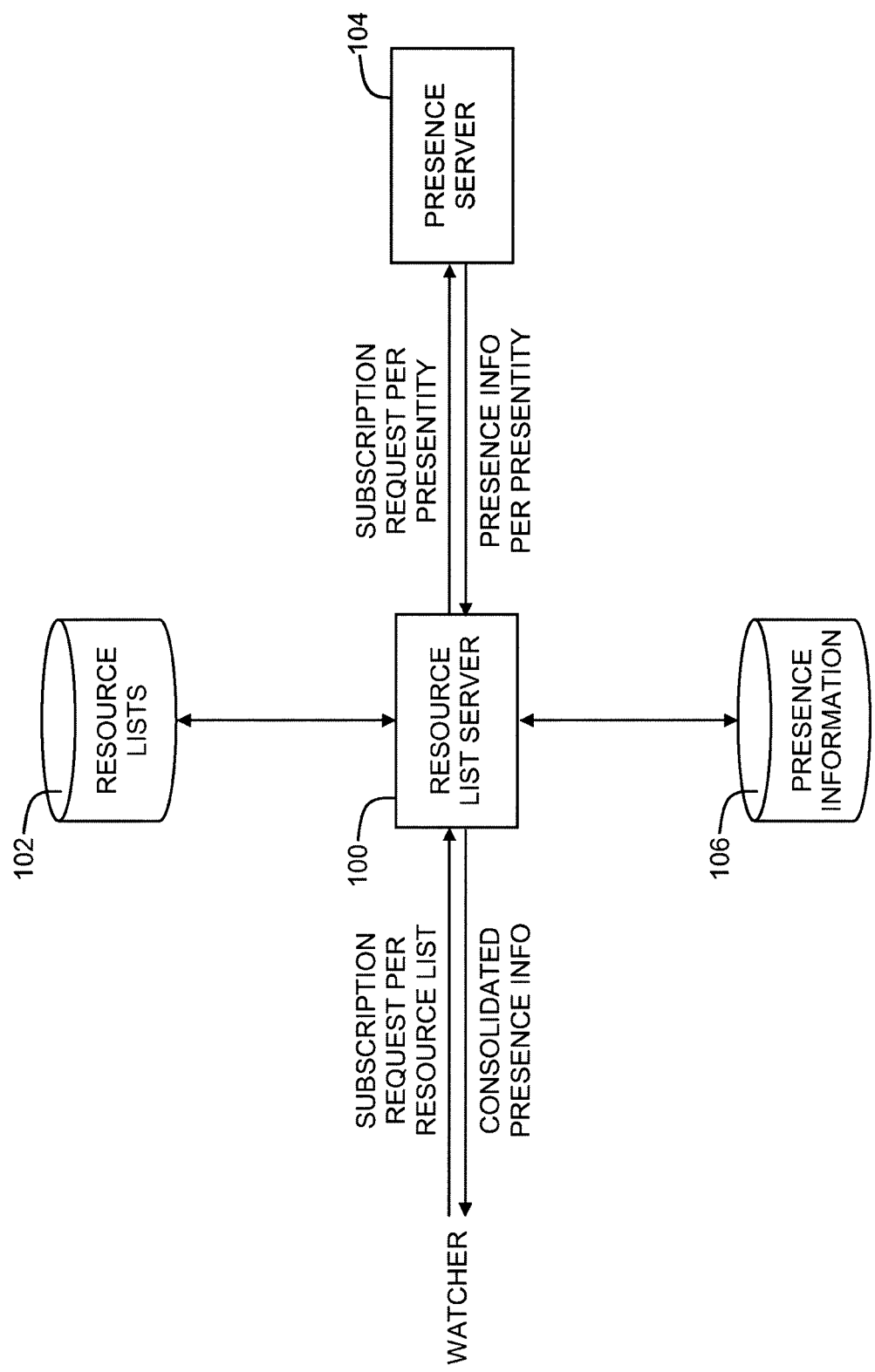
FIG. 1 is a simplified conceptual illustration of a system for optimized cooperation between resource list servers and presence servers, constructed and operative in accordance with an embodiment of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a simplified conceptual illustration of a system for optimized cooperation between resource list servers and presence servers, constructed and operative in accordance with an embodiment of the invention. In the system of FIG. 1, a resource list server (RLS) 100 manages or otherwise accesses one or more resource lists 102, where each resource list 102 includes identifiers for one or more presentities. RLS 100 receives subscription requests from one or more watchers, where each subscription request indicates one of resource lists 102, and is a request to receive presence information for each presentity listed on the indicated resource list 102. RLS 100 preferably maintains a record of each subscription request received from a watcher, indicating the identity of the watcher and of the resource list 102 indicated in the subscription request. For each presentity included in the resource list indicated in a subscription request received from a watcher, RLS 100 generates a subscription request for presence information for the presentity, and preferably does so only if there is no currently-active subscription request for presence information for the presentity that RLS 100 previously generated or, if RLS 100 is part of a cluster of resource list servers, that any of the other servers in the cluster generated, such as in response to a prior watcher subscription request. Subscription requests generated by RLS 100 do not identify the watcher as the subscriber, but preferably identify RLS 100 as the subscriber. RLS 100 submits, or otherwise causes to be submitted, its subscription requests to a presence server 104 that is tasked with providing presence information for the presentity. When a notification of presentity presence information is received from a presence server, RLS 100 preferably stores the presence information in a presence information database 106. For each presentity included in the resource list indicated in a subscription request received from a watcher, RLS 100 provides the watcher with presence information regarding the presentity. Preferably, RLS 100 only provides presence information when presence information for all of the presentities in the resource list is received, whereupon RLS 100 consolidates the presence information of all the presentities and provides the consolidated presence information to the watcher. When providing a watcher with presence information, RLS 100 preferably applies presence rules filtering in accordance with conventional techniques, and provides presence information in the form of a resource list meta-information (RLMI) document.

The system of FIG. 1 may be illustrated by way of example within the context of the IBM WebSphere® XML Document Management Server (XDMS) and IBM WebSphere® Presence server, commercially available from International Business Machines, Inc., Armonk, N.Y. In this context, when an RLS, such as in an RLS cluster, receives a subscription request from a watcher indicating a resource list, it interacts with the shared list XDMS to receive the indicated resource list and the identity of its member presentities. For each resource list member the RLS creates a backend subscription via an IP Multimedia Subsystem (IMS) core entry point Call Session Control Function (CSCF). Each subscription to a resource is routed to the correct home network and then, via the routing component, to the correct presence server or presence server cluster. Regardless of the number of subscriptions to the same resource list or to different resource lists that are managed by the RLS or RLS cluster, only one subscription is made by the RLS or RLS cluster for presence information for any given presentity. Where RLSs cooperate in a cluster, cluster-level synchronization is preferably employed to ensure that only one RLS server in the cluster creates a subscription for presence information for a given presentity. An RLS subscription for presence information for a given presentity preferably remains active as long as there is at least one RLS in the RLS cluster managing an active subscription to a resource list that includes the presentity.

Figure 2A:
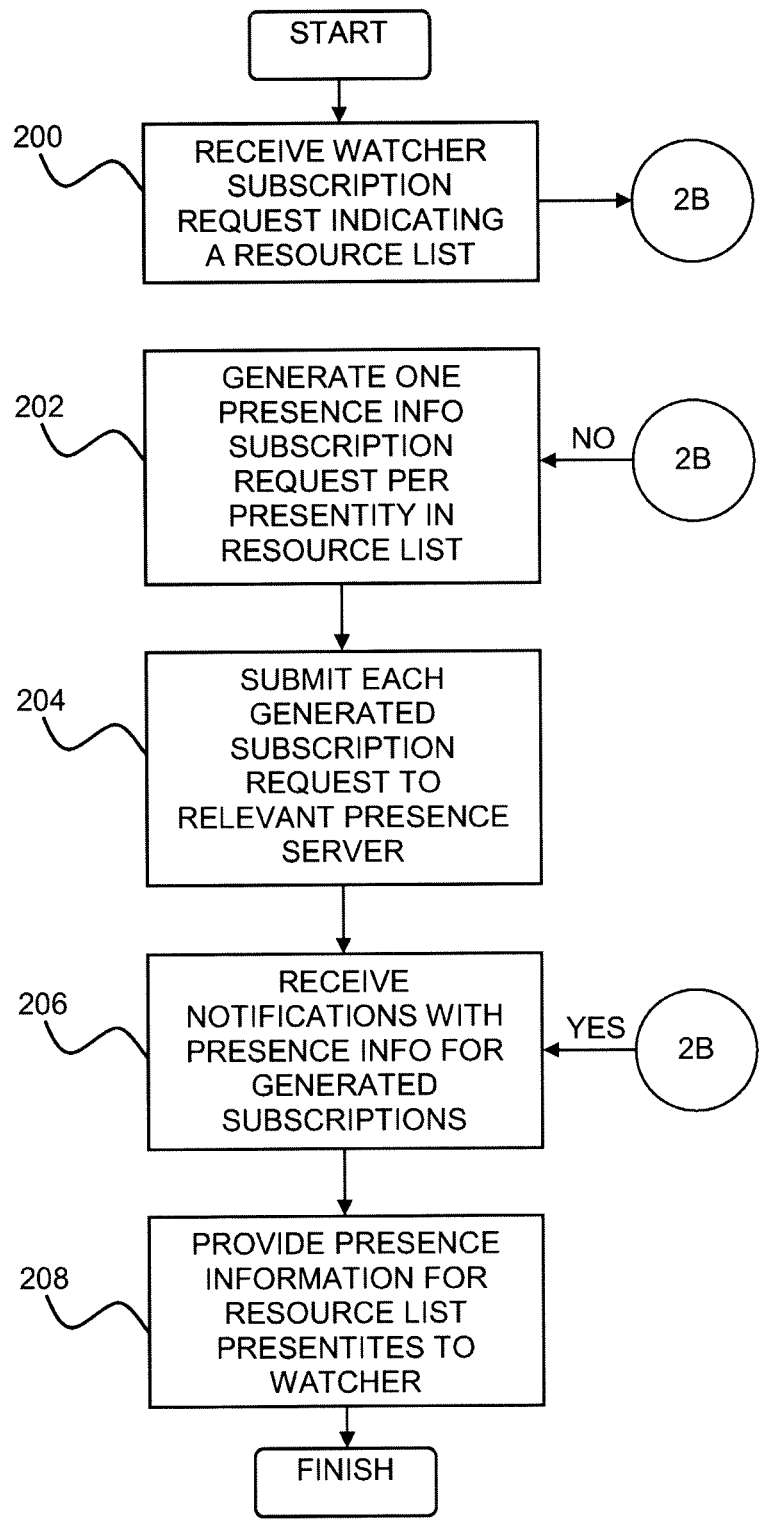
FIGS. 2A and 2B, taken together, is a simplified flowchart illustration of an exemplary method of operation of the system of FIG. 1, operative in accordance with embodiments of the invention.
Figure 2B:
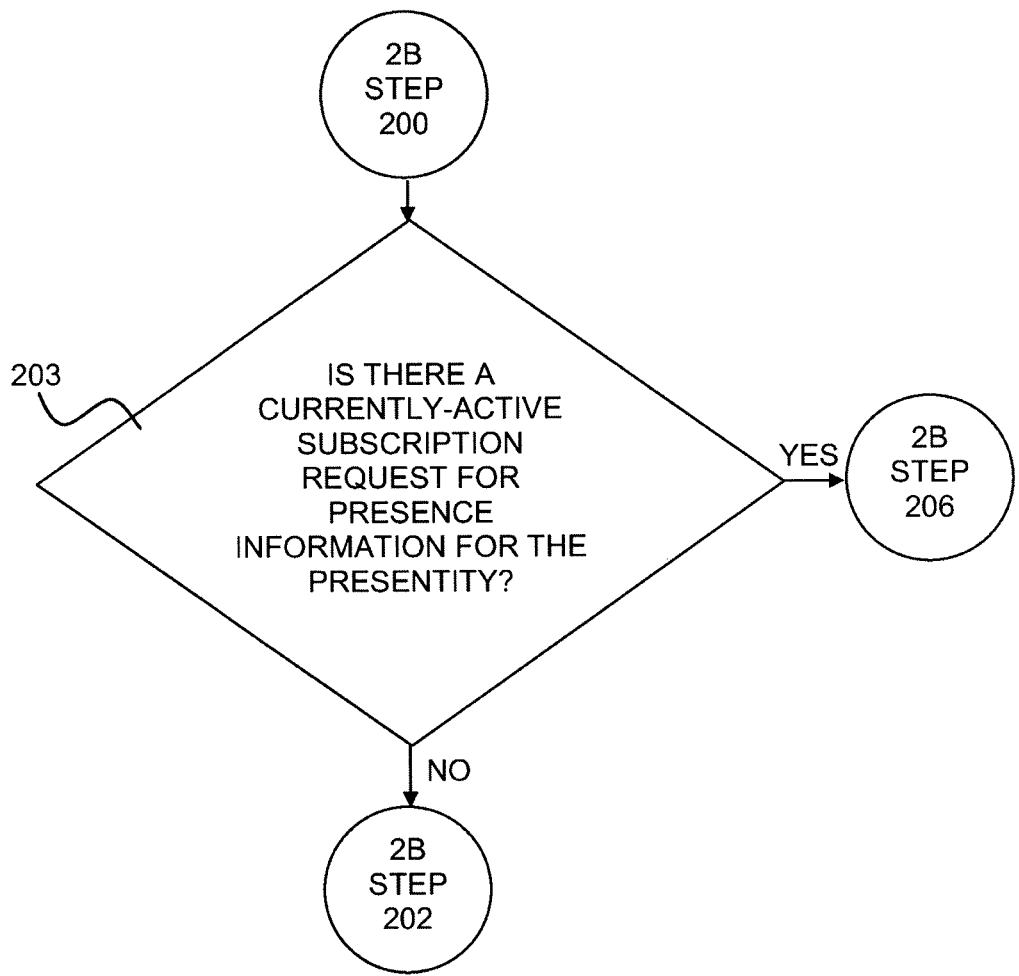

Reference is now made to FIGS. 2A and 2B, which, taken together, is a simplified flowchart illustration of an exemplary method of operation of the system of FIG. 1, operative in accordance with embodiments of the invention. In the method of FIGS. 2A and 2B a subscription request is received from one or more watchers, where each subscription request indicates a resource list and is a request to receive presence information for each presentity listed on the indicated resource list (step 200). For each presentity included in the resource list indicated in a subscription request received from a watcher, a subscription request is generated for presence information for the presentity (step 202), preferably only if there is no currently-active subscription request for presence information for the presentity (step 203), and without identifying the watcher as the subscriber. Each generated subscription request is submitted to a presence server that is tasked with providing presence information for the presentity (step 204). Notifications of presence information for the presentities on the resource list are received from the presence servers that manage the generated subscriptions (step 206), and are provided to the watcher (step 208), preferably where all of the presence information for all of the presentities on the resource list is provided in a consolidated format.

One consequence of implementing the system and method of FIGS. 1, 2A, and 2B, is that presence server 104 does not know which watchers have subscribed to which resource lists, and thus to their underlying presentities. As such, presence server 104 is not able to provide to interested parties information regarding these watchers and the presentities about which these watchers receive presence information. One remedy for this is now described with reference to FIGS. 3 and 4.

Figure 3:
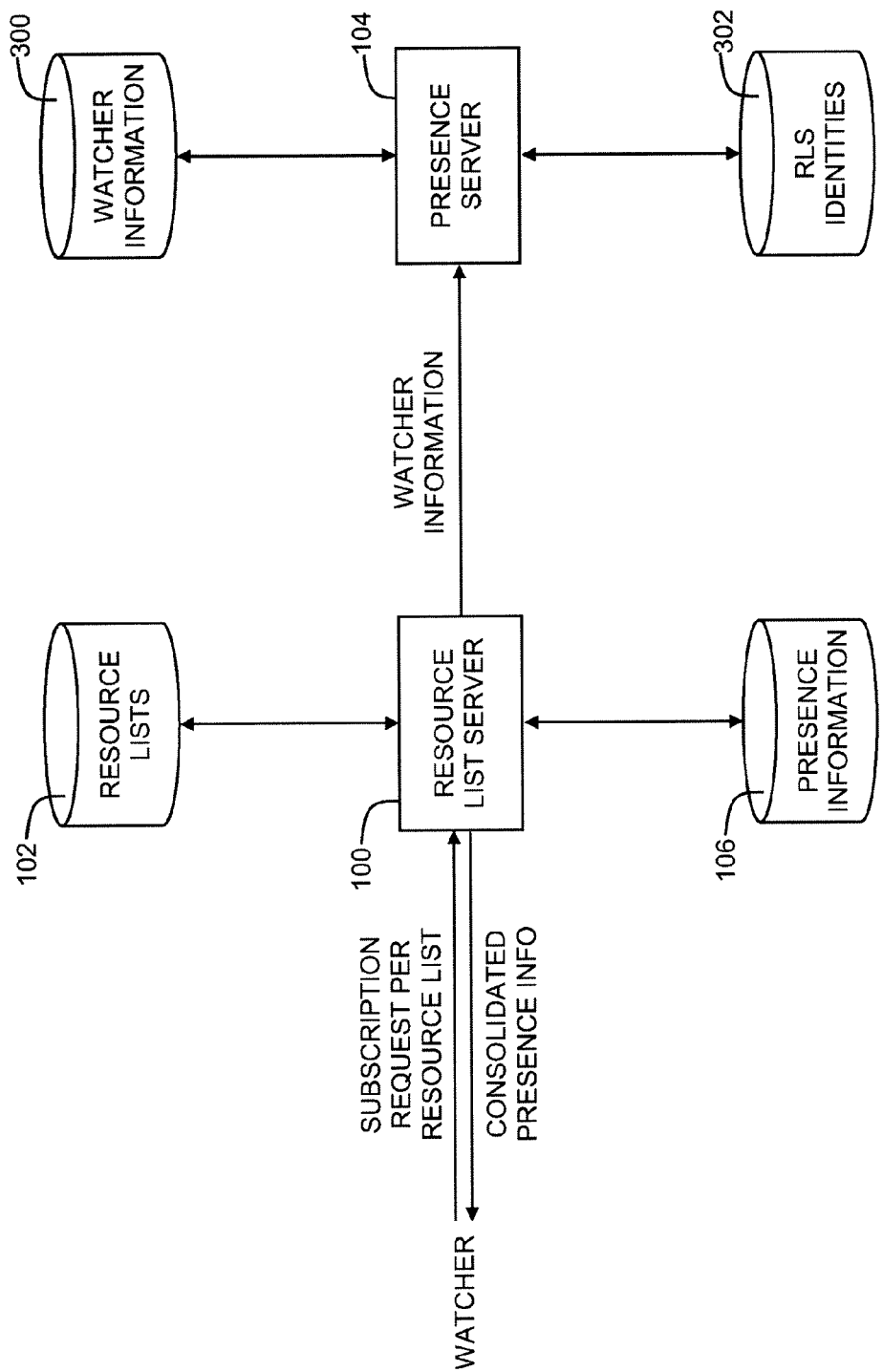
FIG. 3 is a simplified conceptual illustration of an alternative system for optimized cooperation between resource list servers and presence servers, constructed and operative in accordance with an embodiment of the invention.

Reference is now made to FIG. 3, which is a simplified conceptual illustration of an alternative system for optimized cooperation between resource list servers and presence servers, constructed and operative in accordance with an embodiment of the invention. The system of FIG. 3 is substantially similar to the system of FIG. 1 with the notable exception that RLS 100 provides watcher information to presence server 104 via a PUBLISH operation that is performed whenever a new subscription request is received from a watcher to resource list handled by RLS 100 and whenever the state of a subscription to a resource list changes. The watcher information provided by RLS 100 via a PUBLISH operation preferably includes details such as the subscriber ID, the subscription ID, the subscription state, and the event that caused the state change (e.g., subscription timed out). Presence server 104 stores watcher information in a watcher information database 300, and when presence server 104 receives a PUBLISH request from RLS 100 with watcher information, presence server 104 stores the information in database 300, preferably searching database 300 for any information it may already have for the watcher and updating the information accordingly. In this way, presence server 104 will be able to accept subscriptions for watcher information and thereafter provide watcher information to such subscribers.

As was mentioned above, subscription requests generated by RLS 100 do not identify the watcher as the subscriber, but preferably identify RLS 100 as the subscriber. In order to prevent presence server 104 from maintaining watcher information in database 300 where RLS 100 is listed as the watcher, presence server preferably maintains a list 302 of RLS identities. If a subscription request is received by presence server 104, and the identity of the subscriber as indicated by the subscription request matches an RLS identity found in list 302, presence server need not maintain watcher information in database 300 for the subscriber.

Figure 4:
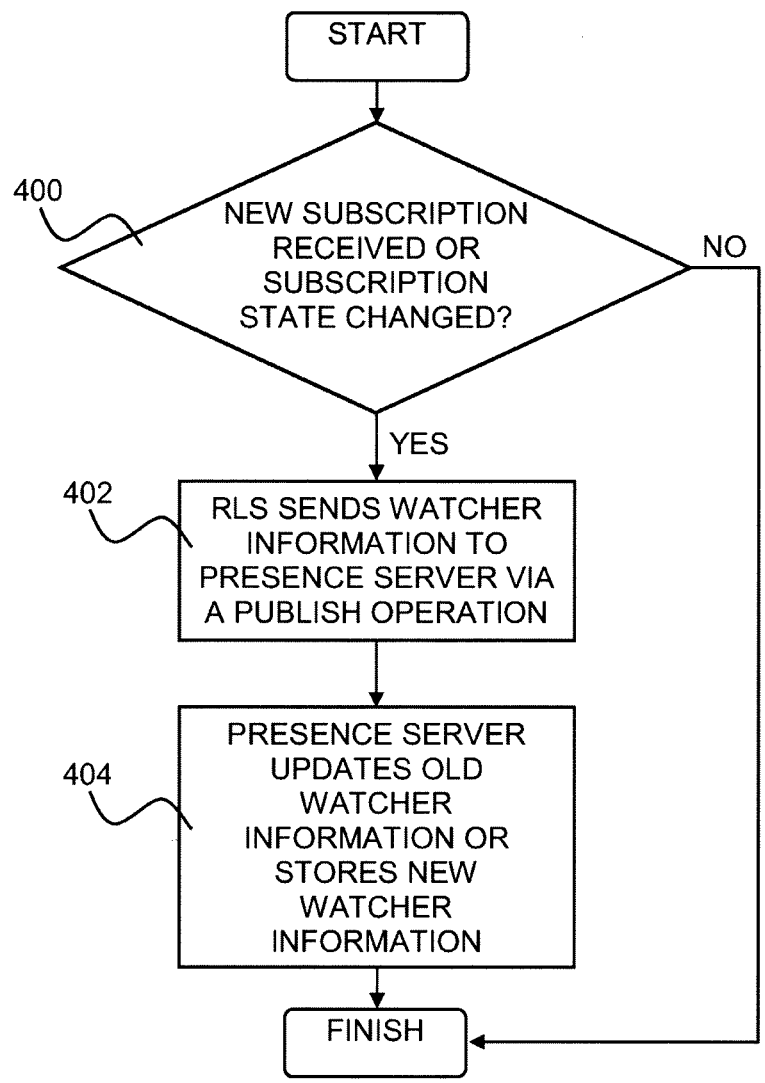
FIG. 4 is a simplified flowchart illustration of an exemplary method of operation of the system of FIG. 3, operative in accordance with embodiments of the invention.

Reference is now made to FIG. 4, which is a simplified flowchart illustration of an exemplary method of operation of the system of FIG. 3, operative in accordance with embodiments of the invention. In the method of FIG. 4, whenever the RLS receives a new subscription request from a watcher to a resource list and whenever the state of a subscription to a resource list changes (step 400) an RLS sends watcher information to a presence server via a PUBLISH operation (step 402). The presence server that receives the watcher information stores the received watcher information as new information regarding the watcher or as an update to any information it already has regarding the watcher (step 404).

Figure 5:
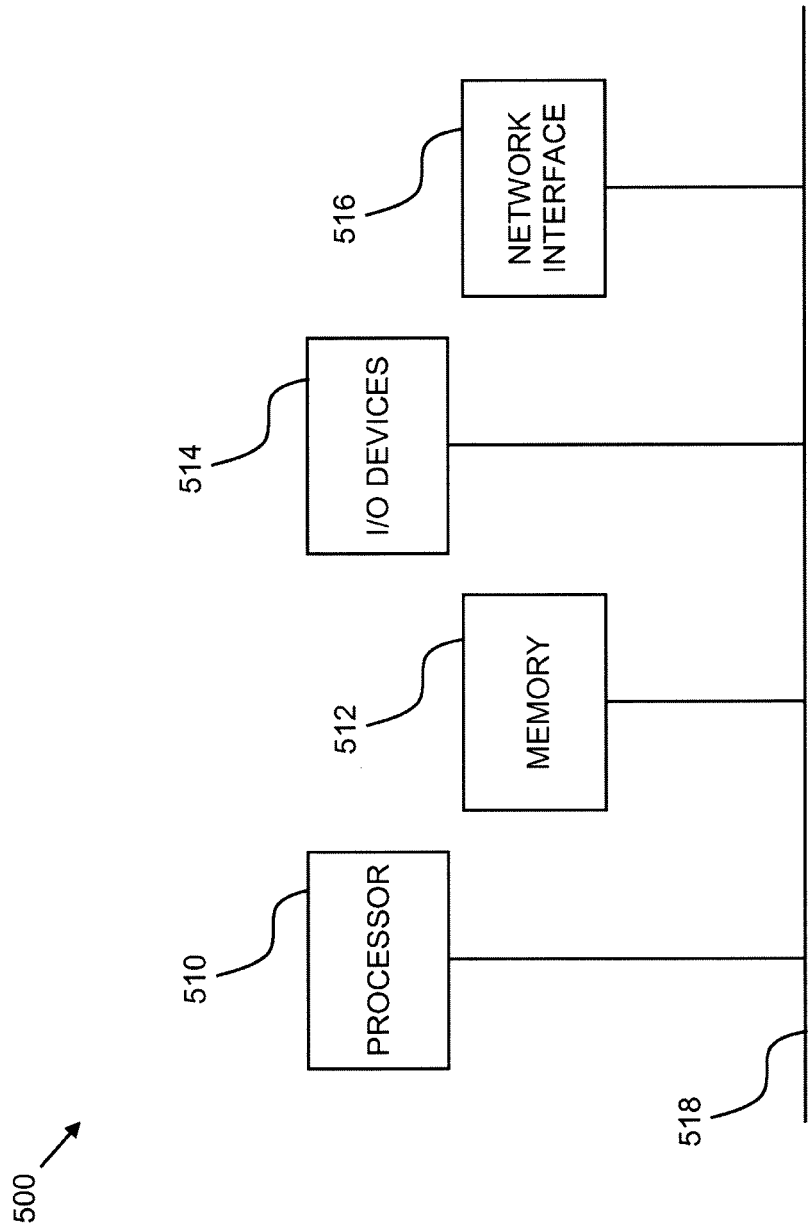
FIG. 5 is a simplified block diagram illustration of an exemplary hardware implementation of a computing system, constructed and operative in accordance with an embodiment of the invention.

Referring now to FIG. 5, block diagram 500 illustrates an exemplary hardware implementation of a computing system in accordance with which one or more components/methodologies of the invention (e.g., components/methodologies described in the context of FIGS. 1-4) may be implemented, according to an embodiment of the invention.

As shown, the techniques for controlling access to at least one resource may be implemented in accordance with a processor 510, a memory 512, I/O devices 514, and a network interface 516, coupled via a computer bus 518 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A system comprising:
a first processing system including at least one processor device configured to:
receive a subscription request that identifies a list indicating a plurality of network entities and includes a request for information for one or more network entities within said list;
determine active subscription requests for individual network entities and compare individual network entities of said list to said determined active subscription requests;
receive information pertaining to individual network entities of said list from a second processing system in response to said comparison indicating said active subscription requests for those individual network entities; and generate one or more subscription requests each for a corresponding one of said network entities of said list and requesting information pertaining to that network entity from said second processing system, wherein each subscription request is generated for said corresponding network entity in response to no other currently-active subscription request being determined by said first processing system to exist for said information pertaining to that network entity.

2. The system of claim 1, wherein said first processing system includes a resource list server, said second processing system includes a presence server, and said requested information includes presence information.

3. The system of claim 2, wherein said resource list server is configured to generate said subscription requests, wherein each of said generated subscription requests includes a request to receive presence information pertaining to said corresponding network entity.

4. The system of claim 3, wherein said resource list server is configured to cause said generated subscription requests to be submitted to at least one presence server that provides presence information regarding said corresponding network entities.

5. The system of claim 4, wherein said resource list server is configured to receive presence information regarding one or more of said network entities listed on said list, and provide said received presence information to a requester of said presence information.

6. The system of claim 2, wherein said resource list server is configured to generate a subscription request identifying said resource list server as a subscriber of said generated subscription request.

7. The system of claim 2, wherein said resource list server is configured to provide information regarding a requester of said presence information to said presence server.

8. The system of claim 7, wherein said resource list server is configured to provide said information pertaining to said requester in response to a change to a state of a subscription to said list.

9. The system of claim 7, wherein said presence server is configured to maintain a list of resource list server identities, and refrain from maintaining requester information for a subscriber in response to an identity of said subscriber matching an identity of a resource list server.

10. A method comprising:
receiving a subscription request at a first processing system that identifies a list indicating a plurality of network entities and includes a request for information for one or more network entities within said list;
determining at said first processing system active subscription requests for individual network entities and comparing individual network entities of said list to said determined active subscription requests;
receiving at said first processing system information pertaining to individual network entities of said list from a second processing system in response to said comparison indicating said active subscription requests for those individual network entities; and
generating at said first processing system one or more subscription requests each for a corresponding one of said network entities of said list and requesting information pertaining to that network entity from said second processing system, wherein each subscription request is generated for said corresponding network entity in response to no other currently-active subscription request being determined by said first processing system to exist for said information pertaining to that network entity.

11. The method of claim 10, wherein said first processing system includes a resource list server, said second processing system includes a presence server, and said requested information includes presence information.

12. The method of claim 11, wherein each of said generated subscription requests includes a request to receive presence information pertaining to said corresponding network entity.

13. The method of claim 12, further comprising:
submitting said generated subscription requests to at least one presence server that provides presence information pertaining to said corresponding network entities.

14. The method of claim 13, further comprising:
receiving presence information pertaining to one or more of said network entities listed on said list; and
providing said received presence information to a requester of said presence information.

15. The method according to claim 11, wherein said generating comprises:
generating a subscription request indicating a resource list server as a subscriber of said generated subscription request.

16. The method of claim 11, further comprising:
providing information pertaining to a requester of said presence information to said presence server.

17. The method of claim 16, wherein said providing information comprises:
providing said information pertaining to said requester in response to a change to a state of a subscription to said list.

18. The method of claim 16, further comprising:
maintaining a list of resource list server identities at said presence server; and
refraining from maintaining at said presence server requester information for a subscriber in response to an identity of said subscriber matching an identity of a resource list server.

19. A computer program product comprising:
a computer readable storage medium that excludes a computer readable signal medium and includes computer program instructions stored thereon and configured to:
receive a subscription request at a first processing system identifying a list and including a request to receive information pertaining to one or more network entities listed on said list;
determine at said first processing system active subscription requests for individual network entities and compare individual network entities of said list to said determined active subscription requests;
receive at said first processing system information pertaining to individual network entities of said list from a second processing system in response to said comparison indicating said active subscription requests for those individual network entities; and
generate at said first processing system one or more subscription requests each for a corresponding one of said network entities of said list and requesting information pertaining to that network entity from said second processing system, wherein each subscription request is generated for said corresponding network entity in response to no other currently-active subscription request being determined by said first processing system to exist for information pertaining to that network entity.

20. The computer program product of claim 19, wherein said first processing system includes a resource list server, said second processing system includes a presence server, and said requested information includes presence information.

21. The computer program product of claim 20, wherein each of said generated subscription requests includes a request to receive presence information pertaining to said corresponding network entity.

22. The computer program product of claim 21, wherein said computer program instructions are further configured to:
submit said generated subscription requests to at least one presence server that provides presence information pertaining to said corresponding network entities.

23. The computer program product of claim 22, wherein said computer program instructions are further configured to:
receive presence information pertaining to one or more of said network entities listed on said list; and
provide said received presence information to a requester of said presence information.

24. The computer program product of claim 20, wherein said computer program instructions are further configured to:
generate a subscription request indicating a resource list server as a subscriber of said generated subscription request.

25. The computer program product of claim 20, wherein said computer program instructions are further configured to:
provide information pertaining to a requester of said presence information to said presence server.

26. The computer program product of claim 25, wherein said computer program instructions are further configured to:
provide said information pertaining to said requester in response to a change of a state of a subscription to said list.

27. The computer program product of claim 25, wherein said computer program instructions are further configured to:
maintain a list of resource list server identities at said presence server; and
refrain from maintaining requester information pertaining to a subscriber in response to an identity of said subscriber matching an identity of a resource list server.

* * * * *